(12) United States Patent
Blackmon et al.

(10) Patent No.: US 10,647,796 B2
(45) Date of Patent: May 12, 2020

(54) METHODS OF CATALYST ACTIVATION

(71) Applicant: FINA TECHNOLOGY, INC., Houston, TX (US)

(72) Inventors: Kenneth P Blackmon, Houston, TX (US); David Ribour, Houston, TX (US); Shabbir Malbari, Houston, TX (US); Tim Coffy, Houston, TX (US); Michel Daumerie, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 16/270,699

(22) Filed: Feb. 8, 2019

(65) Prior Publication Data

US 2019/0169331 A1 Jun. 6, 2019

Related U.S. Application Data

(62) Division of application No. 14/990,899, filed on Jan. 8, 2016, now Pat. No. 10,246,535, which is a division of application No. 12/782,810, filed on May 19, 2010, now Pat. No. 9,260,541, which is a division of application No. 12/272,113, filed on Nov. 17, 2008, now abandoned.

(51) Int. Cl.
*C08F 210/06* (2006.01)
*C08F 10/00* (2006.01)
*C08F 4/642* (2006.01)

(52) U.S. Cl.
CPC ............ *C08F 210/06* (2013.01); *C08F 10/00* (2013.01)

(58) Field of Classification Search
USPC .................................................. 526/919
See application file for complete search history.

(56) References Cited

FOREIGN PATENT DOCUMENTS

WO      WO 2008/109042 A1 *    9/2008    ............... C08F 2/00

* cited by examiner

*Primary Examiner* — Fred M Teskin
(74) *Attorney, Agent, or Firm* — Albert Shung

(57) ABSTRACT

A method comprising preparing a multi-component catalyst system comprising a catalyst and a cocatalyst, and adjusting the level of at least one component of the catalyst system to maintain a user-desired level of catalyst activity throughout a process, wherein the component comprises a catalyst activator and wherein the catalyst activator comprises the catalyst or the cocatalyst. A method comprising contacting a polymerization catalyst system comprising a Ziegler-Natta catalyst and a cocatalyst with a catalyst activator at least twice during a polymerization process, wherein the polymerization process is carried out in a reactor system comprising multiple reactor types.

7 Claims, 9 Drawing Sheets

Effect of initial TEAI amount on the bulk yield
Al/Si ratio is kept constant at 10

Effect of the Al/Si ratio on the bulk yield
At a constant [CMDS]=0.1 mmol

Effect on the yields of the time of polymerization in bulk with the Al/Si of 20 instead of 10

METHODS OF CATALYST ACTIVATION

CROSS-REFERENCE TO RELATED APPLICATIONS

This application is a divisional of U.S. patent application Ser. No. 14/990,899, filed on Jan. 8, 2016, now issued as U.S. Pat. No. 10,246,535, which is a divisional of U.S. patent application Ser. No. 12/782,810, filed on May 19, 2010, now issued U.S. Pat. No. 9,260,541, which is a divisional of U.S. patent application Ser. No. 12/272,113, filed on Nov. 17, 2008, now abandoned, all of which are incorporated herein by reference in their entireties for all purposes.

STATEMENT REGARDING FEDERALLY SPONSORED RESEARCH OR DEVELOPMENT

Not applicable.

BACKGROUND

Technical Field

This disclosure relates to methods of improving the efficiency of polymerization processes employing multiple reactors. More specifically, this disclosure relates to methods of activating and/or maintaining catalytic activity across a multi-reactor chain for the production of impact copolymers.

Background

Synthetic polymeric materials, particularly polypropylene resins, are widely used in the manufacturing of a variety of end-use articles ranging from medical devices to food containers. Commercial grade polypropylenes are typically produced using a Ziegler-Natta and/or a metallocene catalyst in a polymerization process. Many industries, such as the packaging industry, utilize these polypropylene materials in various manufacturing processes to create a variety of finished goods.

Impact copolymers are a rapidly growing segment of the market for synthetic polymeric materials. In contrast to homopolymers, these materials consist of at least two monomers synthesized in such a fashion as to generate a final product having improved mechanical and/or physical properties when compared to the homopolymer. For example, a polypropylene impact copolymer may be synthesized through the additional copolymerization of propylene and ethylene in a secondary reactor downstream of at least one reactor for synthesis of the polypropylene homopolymer. Varying parameters, such as the reaction conditions in the secondary reactor and/or the quantities of comonomer used may allow for the production of a polypropylene impact copolymer tailored to meet the needs of a wide-range of end-use applications. One drawback to the production of impact copolymers is the variation in production process efficiency due to the use of reactor systems comprising multiple types of reactors. Thus, it would be desirable to develop a method of producing impact copolymers having an improved production process efficiency.

SUMMARY

Disclosed herein is a method comprising preparing a multi-component catalyst system comprising a catalyst and a cocatalyst, and adjusting the level of at least one component of the catalyst system to maintain a user-desired level of catalyst activity throughout a process, wherein the component comprises a catalyst activator and wherein the catalyst activator comprises the catalyst or the cocatalyst.

Further disclosed herein is a method comprising contacting a polymerization catalyst system comprising a Ziegler-Natta catalyst and a cocatalyst with a catalyst activator at least twice during a polymerization process, wherein the polymerization process is carried out in a reactor system comprising multiple reactor types.

Also disclosed herein is a method comprising contacting a propylene monomer and ethylene comonomer with a catalyst system in a reactor system comprising a loop reactor disposed upstream of a gas phase reactor under conditions suitable to produce a polypropylene impact copolymer, wherein a catalyst activator is introduced to the reactor system upstream of the gas phase reactor.

The foregoing has outlined rather broadly the features and technical advantages of the present disclosure in order that the detailed description of the embodiments that follow may be better understood. Additional features and advantages of the embodiments will be described hereinafter that form the subject of the claims of the disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

DETAILED DESCRIPTION

Disclosed herein are methods of improving the efficiency, for example production efficiency, of a process employing a multi-component catalyst system. In an embodiment, a method of improving the efficiency of a process comprises preparing the multi-component catalyst system comprising a catalyst and a cocatalyst; and adjusting the level of at least one component of the catalyst system to maintain a user-desired level of activity throughout the reaction process. The component that is adjusted is hereinafter referred to as the catalyst activator. In an embodiment, the catalyst system comprises a Ziegler-Natta catalyst, a cocatalyst, and optionally a second cocatalyst and/or an external electron donor. The catalyst activator may comprise a catalyst, a cocatalyst, an external donor, or combinations thereof.

Herein, the catalyst activator functions to increase the activity of an active catalyst system such that the catalyst system maintains a user-desired level of activity throughout the process. It is to be understood that the catalyst system, when formed, comprises multiple components that are contacted in a predetermined amount and fashion to form a multi-component catalyst system, which collectively functions to accelerate a process and possesses an initial activity that may decrease over the course of the process. The catalyst activator may comprise one or more of the components of the multi-component catalyst system. However, one of the catalyst activator's functions is to increase or maintain some threshold level of activity of the catalyst system, whereas the catalyst system's primary function is to accelerate the process. Catalyst activators and methods of using same are described in more detail later herein.

The catalyst system may be any catalyst system capable of having its activity increased by another material, and the catalyst activator may be any material capable of increasing the activity of the catalyst system. In an embodiment, the catalyst system comprises a ZN catalyst, a cocatalyst, and optionally an external electron donor; and the catalyst activator comprises a catalyst, a cocatalyst, an external electron donor, or combinations thereof. The catalyst system may be used to accelerate a polymerization process, for example a process for the production of a polypropylene impact copolymer. In an embodiment, the polymerization process may employ a reactor system comprising one or more reactor types which is hereafter referred to as the reaction zone. An embodiment of a multi-reactor system for use in a polymerization process is schematized in FIG. 1.

Figure 1:
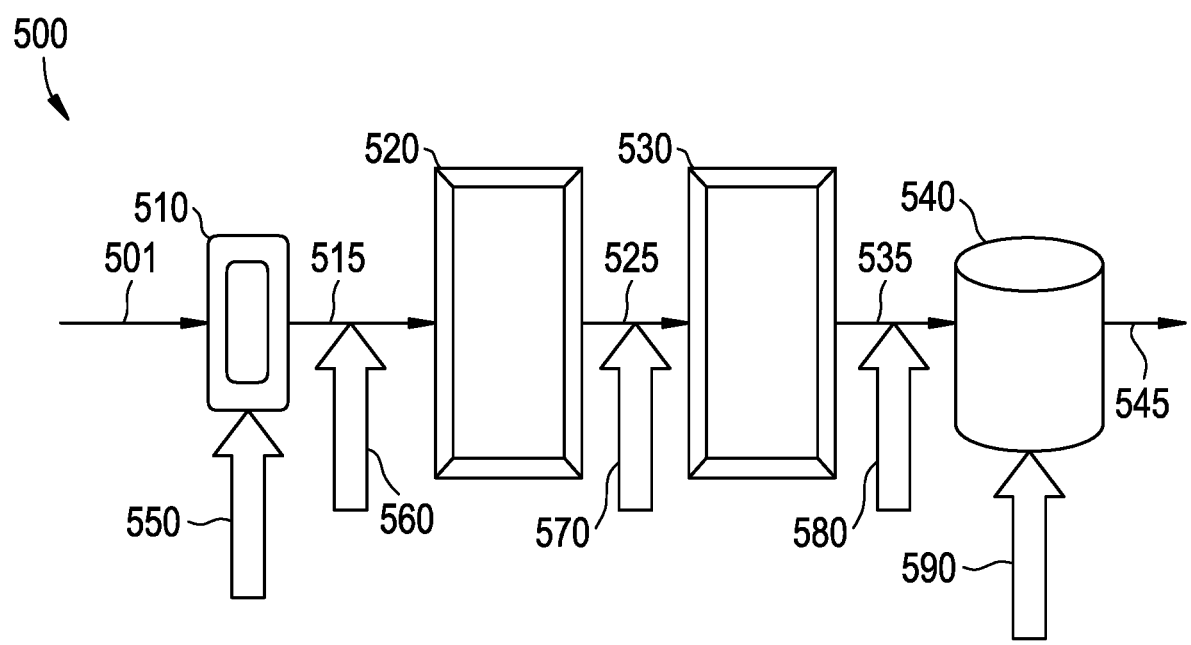
FIGS. 1-2 are embodiments of reactor systems.

Referring to FIG. 1, the reactor system 500 comprises a feedstream 501 to one or more reactors, such as a pre-polymerization loop reactor 510 that is in fluid communication with the first bulk loop reactor 520 via conduit 515. The first bulk loop reactor 520 may be upstream of and in fluid communication with a second bulk loop reactor 530 via conduit 525, which in turn is upstream up of and in fluid communication with one or more gas phase reactors 540 via conduit 535. Various devices useful for the polymerization processes disclosed herein, such as degasification, devolitization, compounding, and/or pelletization units, may be disposed downstream from one or more of the reactors, e.g., from gas phase reactor 540, and may receive one or more effluent streams 545 from such reactors for further processing.

Figure 2:
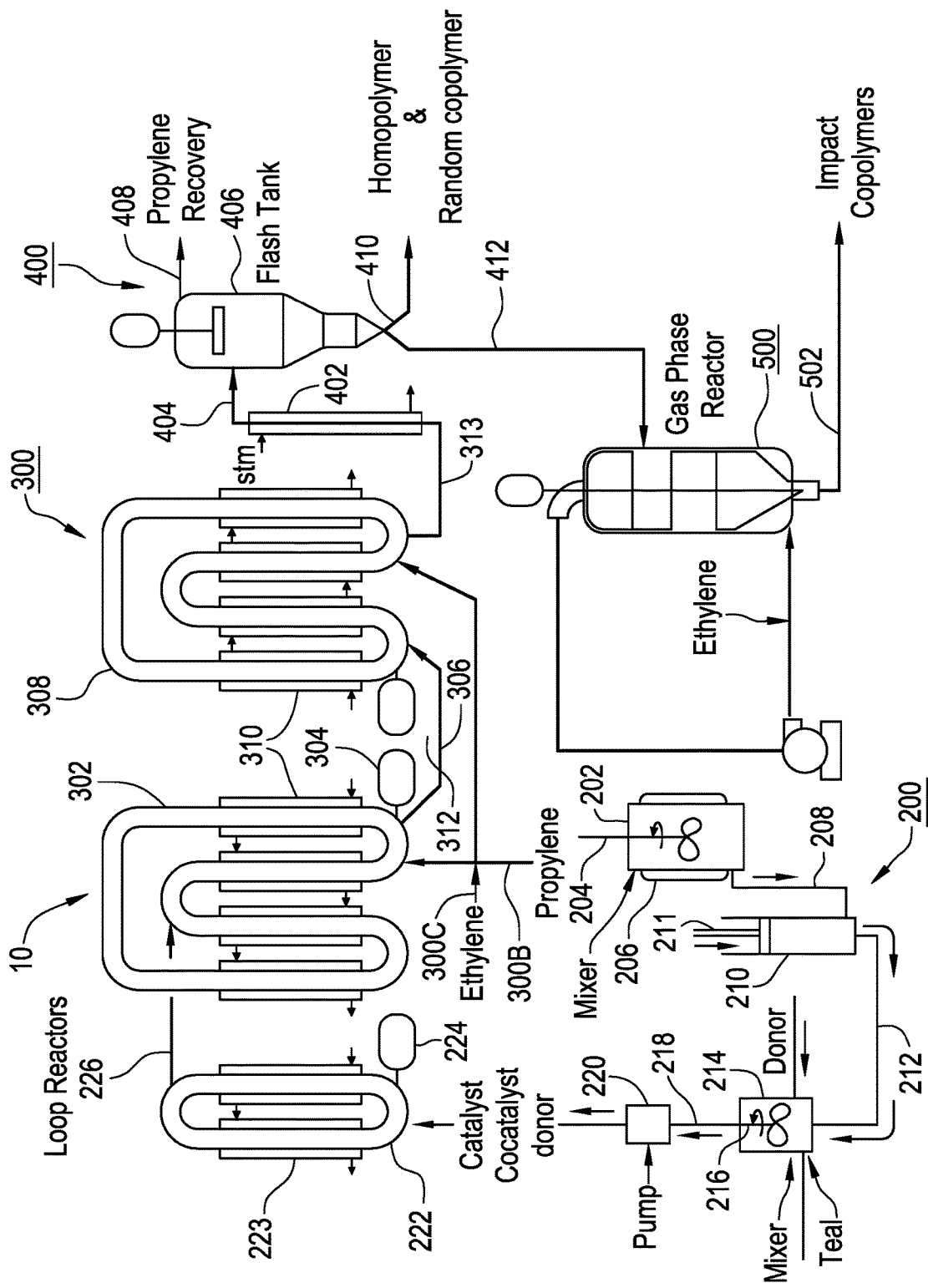

A more detailed example of a bulk loop reactor system 10 suitable for propylene polymerization using one or more catalysts of the type disclosed herein (e.g., Ziegler-Natta catalysts) is illustrated in FIG. 2. The bulk loop reactor system 10 includes a catalyst mixing and injection system 200 upstream of and in communication with a pair of loop reactors 300, a polymer recovery system 400 downstream of the loop reactors 300, and a gas phase reactor 500 receiving recovered polymer from recovery system 400. It will be understood that the bulk loop reactor system 10 may include a single loop reactor, a single gas phase reactor, multiple loop reactors, multiple gas phase reactors, or any combination thereof, including one or more other olefin polymerization reactors, such as other polymerization reactors. The bulk loop reactors 300 may further include a propylene feed conduit 300B and a co-monomer (e.g., ethylene) feed conduit 300C. The catalyst mixing and injection system 200 includes a mixing vessel 202. The mixing vessel 202 includes a mixing paddle 204 and a heating jacket 206. A high molecular weight oil, e.g., mineral oil, and the Ziegler-Natta catalyst may be introduced into the mixing vessel 202. Generally the high molecular weight oil is heated to a sufficient temperature (in the range of from 30° C. to at least 90° C., depending upon the type of oil used) in order to reduce the viscosity of the oil and allow the mixing paddle 204 to sufficiently mix the catalyst and high molecular weight oil. The heated mixture of high molecular weight oil and catalyst is then conveyed via conduit 208 to an injector 210 where it may cool and form a "paste." The paste is urged during the compression stroke of a plunger 211 into a conduit 212 and into another mixing vessel 214 wherein a co-catalyst, such as triethyl aluminum (TEAl), and optionally one or more electron donors may be blended with the paste by the mixing paddle 216. The resulting mixture of catalyst, cocatalyst and optional electron donor exits the mixing vessel 214 via conduit 218 and is metered by the pump 220 into a pre-polymerization loop reactor 222 containing liquid propylene monomer.

Polymerization temperatures in the pre-polymerization loop reactor 222 may be from between $-10°$ C. and 40° C. and are controlled by cooling jackets 223. Polypropylene granules are formed as propylene polymerization begins upon contact between the catalyst, co-catalyst, and optional donor and the liquid propylene monomer, all of which are circulated within the pre-polymerization loop reactor 222 by a circulation pump 224. Pre-polymerization cycle time may last between 7 and at least 30 minutes, alternatively between 15 and 20 minutes before the polypropylene granules are conveyed via conduit 226 into the first loop reactor 302 containing liquid propylene monomer. A circulating pump 304 circulates the polypropylene granules and liquid propylene monomer within the first loop reactor 302. As propylene polymerization continues in the first loop reactor 302, the polypropylene granules increase in size. The first loop reactor 302 cycle time may last between 20 and at least 95 minutes, alternatively between 30 and 50 minutes before polypropylene granules are conveyed via conduit 306 into the second loop reactor 308. Polymerization temperatures in the first and second loop reactors, 302 and 308 respectively, may range from between 60° C. to 80° C. and may be controlled by cooling jackets 310. Circulation pump 312 circulates the polypropylene granules and liquid propylene monomer in the second loop reactor 308. The second loop reactor 308 cycle time may last between 10 and at least 60 minutes, alternatively between 20 and 50 minutes before the polypropylene granules are conveyed via conduit 313 into the polymer recovery system 400.

A heating column 402 receives the polypropylene granules from the conduit 313. Sufficient heat is applied to the polypropylene granules such that upon entering the flash tank 406 from the conduit 404, a substantial portion of the liquid propylene monomer accompanying the polypropylene granules vaporizes and thus separates from the granules. The gaseous propylene and a portion of the polymerization by-products are extracted from the flash tank 406 via the conduit 408. This gaseous propylene may be recompressed, filtered, to remove impurities and other contaminants that may adversely react with the catalyst system (not shown), and returned to the loop reactors 300.

The polypropylene homopolymer recovered from polymer recover system 400 may exit via a conduit designated reference arrow 410 and further processed. Alternatively, the polypropylene homopolymer may be subjected to polymerization with one or more additional monomers, such as ethylene. In such embodiments, the polypropylene granules exiting the flash tank 406 via conduit 412 may be conveyed into the gas phase reactor 500 where an additional monomer such as ethylene may be introduced and the ethylene-propylene rubber (EPR) portion of the impact copolymer generated. The polypropylene impact copolymer granules exit the gas phase reactor 500 via conduit 502 and may be directed to extruders for processing into pellets. During the pelletization process, one or more other materials, such as, stabilizers, UV blockers, antistatic chemicals and/or pigments, may be blended with the polymer granules.

The catalyst activator may be introduced to the reaction zone at any or at various points in the reaction zone. For example, with reference to FIG. 1, the catalyst activator may be introduced to the reaction zone in the prepolymerization reactor 510, reference arrow 550; after the prepolymerization reactor 510, at reference arrow 560, after the first bulk loop reactor 520, at reference arrow 570, after the second bulk loop reactor 530, at reference arrow 580, in the gas phase reactor 540, at reference arrow 590; or combinations thereof. Referring to FIG. 2, the catalyst activator may be introduced to the reaction zone at one or more of the locations such as for example, at loop reactors 222, 302, or 308; at conduits 306 or 313; or at reactors 223 or 500. These locations are not intended to be limiting as the disclosure includes any possible distributed catalyst activator addition configurations.

In an embodiment, the catalyst activator may be introduced to the reaction zone continuously using devices that allow for the controlled addition of the material at locations in the reaction zone of the type previously described. Devices suitable for the continuous controlled addition of catalyst activators include for example and without limitation metering systems such as mass flow controllers. Alternatively, the catalyst activator may be introduced to the reaction zone instantaneously as a single aliquot or complement of material.

In an embodiment, the catalyst system comprises a Ziegler-Natta (ZN) catalyst. ZN catalysts are stereospecific complexes formed from a transition metal halide and a metal alkyl or hydride. The ZN catalysts are derived from a halide of a transition metal, such as titanium or vanadium. The catalyst is usually comprised of a titanium halide supported on a magnesium compound. ZN catalysts, such as titanium tetrachloride ($TiCl_4$), supported on an active magnesium dihalide, such as magnesium dichloride or magnesium dibromide, are described in the literature for example in U.S. Pat. Nos. 4,298,718 and 4,544,717, each of which is incorporated by reference herein in its entirety.

In an embodiment, the ZN catalyst may be used in conjunction with a cocatalyst to form a catalyst system. Suitable co-catalysts may take the form of cocatalysts that are commonly employed in ZN polymerization reactions. Thus, the cocatalyst can be generally characterized as organometallic compounds of metals of Groups 1A, 2A, and 3B of the Periodic Table of Elements. As a practical matter, organoaluminum compounds are normally used as cocatalysts in polymerization reactions. Specific examples include triethylaluminum, tri-i sobutylaluminum, diethylaluminum chloride, diethylaluminum hydride and the like. Activating cocatalysts normally employed may include methylalumoxane (MAO), triethylaluminum (TEAl), tri-isobutylaluminum (TIBAL), or combinations thereof.

The cocatalyst may or may not be associated with or bound to a support, either in association with the catalyst component (e.g., ZN) or separate from the catalyst component, as is described by Gregory G. Hlatky, *Heterogeneous Single-Site Catalysts for Olefin Polymerization* 100(4) *Chemical Reviews* 1347-1374 (2000), which is incorporated by reference herein in its entirety.

ZN catalysts may also be used in conjunction with one or more internal and/or external electron donors. An internal electron donor may be used in the formation reaction of the catalyst. Thus, internal electron donors are added during the preparation of the catalysts and may be combined with the support or otherwise complexed with the transition metal halide. Examples of internal electron donors include: amines, amides, ethers, esters, aromatic esters, ketones, nitrites, phosphines, stibines, arsines, phosphoramides, thioethers, thioesters, aldehydes, alcoholates, and salts of organic acids.

An external electron donor or selectivity control agent (SCA) may be used for stereoregulation in the polymerization reaction and may be added during the polymerization process. Examples of external donors include without limitation the organosilicon compounds such as cyclohexylmethyl dimethoxysilane (CMDS), dicyclopentyl dimethoxysilane (CPDS) and diisopropyl dimethoxysilane (DIDS). In an embodiment, the external electron donor may be present in an amount of from 0.5 ppm to 300 ppm, alternatively from 1 to 150 ppm, or alternatively from 3 ppm to 50 ppm based on the weight of propylene feed.

A description of the two types of electron donors is provided in U.S. Pat. Nos. 6,410,663 and 4,535,068, each of which is hereby incorporated by reference herein in its entirety.

ZN catalysts are typically supported, and the support materials may include talc, inorganic oxides, clays and clay minerals, ion-exchanged layered compounds, diatomaceous earth compounds, zeolites, a resinous support material, such as a polyolefin, magnesium halides, magnesium dihalides, such as magnesium dichloride or combinations thereof. Specific examples of inorganic oxides that may be useful support materials include without limitation silica, alumina, magnesia, titania and zirconia. The inorganic oxides used as support materials may have an average particle size of from 10 microns to 600 microns or from 30 microns to 100 microns, a surface area of from 50 $m^2/g$ to 1,000 $m^2/g$ or from 100 $m^2/g$ to 400 $m^2/g$ and a pore volume of from 0.5cc/g to 3.5 cc/g or from 0.5 cc/g to 2 cc/g, for example. In an embodiment, the support comprises magnesium dichloride. In such an embodiment, the support may have an average particle size of from 5 microns to 100 microns, alternatively from 10 microns to 90 microns, alternatively from 20 microns to 80 microns.

One of ordinary skill in the art with the benefits of this disclosure may determine the effective amounts of each component of the multi-component catalyst system (e.g., catalyst, cocatalyst, external donor) to produce a desired result. The result desired (e.g., increased product yield, increased production rate) will depend on the nature of the reaction process. The methodologies disclosed herein may result in an increased level of catalyst activity over the course of the reaction process, an increased level of catalyst activity at one or more locations in the reaction zone or an increased level of catalyst activity at one or more intervals during the reaction process when compared to the catalyst activity of a process carried out using alternative methodologies.

The catalyst activator may comprise or consist essentially of one of more of the aforementioned components. In an embodiment, the catalyst activator comprises a cocatalyst. The cocatalyst may be of the type previously described herein. In some embodiments, the catalyst activator and cocatalyst used to prepare the catalyst system are the same compounds. Alternatively, the catalyst activator and the cocatalyst used to prepare the catalyst system are different compounds.

In an embodiment, the catalyst activator comprises the cocatalyst. In such embodiments, the catalyst activator may be added to provide a total amount of cocatalyst in excess of the amount normally employed in the process. Herein the amount normally employed refers to the amount of cocatalyst used in an otherwise similar catalyst system and production process not employing a catalyst activator. In embodiments not employing a catalyst activator the total amount of cocatalyst normally introduced to the reaction zone may be designated x. For example x may be from 50 ppm to 400 ppm, alternatively from 100 ppm to 350 ppm, alternatively from 150 ppm to 300 ppm based on the weight of propylene feed. In an embodiment, the catalyst activator comprises the same compound as the cocatalyst and the total amount of catalyst activator (i.e., cocatalyst) introduced to the reaction zone may be designated y. In such embodiments, the total amount of cocatalyst introduced to the reaction zone may be greater than the total amount of cocatalyst introduced to the reaction zone in an otherwise similar process not employing a catalyst activator. In other words y is greater than x. Alternatively y is 1.5 times greater than x, alternatively y is 2.0 times greater than x.

In an alternative embodiment, the catalyst activator is the same compound as the cocatalyst used to prepare the catalyst system however, the cocatalyst is present in an initial amount that is reduced in comparison to some "normal initial amount" of cocatalyst typically used to prepare the catalyst system. For example, the cocatalyst may be present in a normal initial amount (z), however, when used as a catalyst activator, the cocatalyst may be present in a reduced initial amount (b) wherein b is less than z. For example z may be from 50 ppm to 400 ppm, alternatively from 100 ppm to 350 ppm, alternatively from 150 ppm to 300 ppm.

In an embodiment, b is 20%, 25%, 30%, 35%, or 40% less than z. For example, the cocatalyst may comprise TEAl which may be present in a reduced initial amount of from 90 ppm to 120 ppm (i.e., b) when compared to a normal initial amount (i.e., z) of 150 ppm. Herein, the normal initial amount refers to the amount of material present prior to contacting the catalyst system with a monomer in a reaction zone under conditions suitable for the polymerization of said monomer.

A catalyst system comprising a reduced initial amount of cocatalyst b may comprise an initial amount of catalyst that is increased when compared to a "normal amount" of catalyst (n) that is initially present in the system. For example, a catalyst system may comprise a reduced initial amount of cocatalyst (b) and an increased initial amount of catalyst (k). In an embodiment, k is greater than n, alternatively k is 10% greater than n, alternatively k is 20% greater than n, and alternatively k is 25% greater than n. The catalyst amount necessary to compensate for the reduction in catalytic activity due to the decrease in the cocatalyst amount may be determined by one of ordinary skill in the art with the benefits of this disclosure. The resulting catalyst composition comprising a reduced amount of cocatalyst (b) and an increased amount of catalyst (k) may be introduced to a reaction zone as described and catalyze the polymerization of an olefin as described previously herein. In such embodiments, the initial amount of catalyst present in the system may be increased to compensate for the reduced initial amount of cocatalyst. Without wishing to be limited by theory, the reduced amount of cocatalyst (e.g., TEAl) may not fully activate the catalyst resulting in an initial catalytic activity that is reduced when compared to the initial catalytic activity observed in the presence of a normal amount of cocatalyst. In order to maintain a user-desired polymerization rate through some portion of the reaction zone (e.g., FIG. 2, loop reactors 222, 302, 308), additional catalyst may be introduced to the reaction zone.

In such embodiments, additional cocatalyst may be introduced to the reaction zone via one or more distributed additions and function as a catalyst activator to maintain a user-desired threshold of catalytic activity as described previously herein. The amount of additional cocatalyst introduced to the reaction zone and that functions as a catalyst activator may be denoted (m) wherein (m)+(b) equals (z).

In other words, in embodiments wherein the catalyst system comprises a reduced initial amount of cocatalyst and an increased initial amount of catalyst, the total amount of cocatalyst introduced to the reaction zone is equivalent to the normal amount of cocatalyst typically employed in the reaction process. This additional amount of cocatalyst when introduced to the system may function as a catalyst activator. This additional amount of cocatalyst, also termed a complement, may be introduced to the reaction zone via the methodologies described previously herein. For example, the complement of cocatalyst may be introduced to the reaction zone at any appropriate location. For example, the complement of cocatalyst may be introduced to an upstream reactor (e.g., loop reactor, FIG. 2 223, 302, 308) and provide a productivity boost in the downstream reactors (e.g., GPR FIG. 2, 500)

In an embodiment, the process comprises a polymerization process such as the production of polypropylene impact copolymer. Polypropylene impact copolymers are bi-phasic polymers, wherein an elastomeric phase (e.g., EPR) is dispersed as particles in a homopolymer phase or component (e.g., polypropylene homopolymer). The polypropylene impact copolymers may comprise from 2 to 20 wt. % by weight ethylene, alternatively from 5 wt. % to 15 wt. % alternatively from 8 wt. % to 12 wt. % based on the total weight of the copolymer. Herein, percentages of a component refer to the percent by weight of that component in the total composition unless otherwise noted.

The homopolymer phase of a polypropylene impact copolymers may be a propylene homopolymer, provided that the homopolymer phase may contain up to 5% of another alpha-olefin, including but not limited to $C_2$-$C_8$ alpha-olefins such as ethylene and 1-butene. Despite the potential presence of small amounts of other alpha-olefins, this is generally referred to as a polypropylene homopolymer.

The copolymer phase of a polypropylene impact copolymer may be a random copolymer of propylene and ethylene, also referred to as an ethylene/propylene rubber (EPR). Without being limited by theory, the EPR portion of the polypropylene impact copolymer has rubbery characteristics which, when incorporated within the matrix of the homopolymer component, may function to provide increased impact strength to the copolymer. In an embodiment, the EPR portion of the polypropylene impact copolymers comprises from 10 wt. % to 30 wt. % of the copolymer, alternatively 30 wt. % of the copolymer, alternatively 20 wt. % of the copolymer, alternatively 10 wt. % of the copolymer.

The amount of ethylene present in the EPR portion of the polypropylene impact copolymer may be from 30 wt. % to 60 wt. %, alternatively from 35 wt. % to 55 wt. % based on the total weight of the EPR portion. The amount of ethylene present in the EPR portion of the copolymer may be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 $cm^{-1}$/900 $cm^{-1}$ is calculated for each ethylene concentration and a calibration curve may then be constructed. Linear regression analysis on the calibration curve can then be carried out to derive an equation that is then used to determine the EPR ethylene content for a sample material. Alternatively, the amount of ethylene may be determined by nuclear magnetic resonance (NMR) using techniques known to one of ordinary skill in the art with the benefits of this disclosure.

During the production of a polypropylene impact copolymer a certain amount of amorphous polymer is produced. Additionally, the EPR phase of the polypropylene impact copolymer is essentially amorphous. This amorphous material collectively (i.e., EPR fraction and atactic polypropylene) is soluble in xylene and is thus termed the xylene soluble fraction (XS %). In determining the XS %, the polymer is dissolved in hot xylene and then the solution cooled to 0° C. which results in the precipitation of the isotactic or crystalline portion of the polymer. The XS % is the portion of the original amount that remained soluble in the cold xylene. Consequently, the XS % in the polymer is further indicative of the extent of crystalline polymer formed. The total amount of polymer (100%) is the sum of the xylene soluble fraction and the xylene insoluble fraction. In an embodiment, the polypropylene impact copolymer has a xylene soluble fraction of from 8 wt. % to 30 wt. %. Alternatively from 10 wt. % to 25 wt. %, alternatively from 12 wt. % to 20 wt. %. The XS % may be determined in accordance with ASTM D 5492-98.

In an embodiment, the polypropylene impact copolymer may have a melt flow rate (MFR) or melt flow (MF) of from 1 g/10 min. to 150 g/10 min., alternatively from 5 g/10 min. to 140 g/10 min., alternatively from 10 g/10 min. to 130 g/10 min. Excellent flow properties as indicated by a high MFR allow for high throughput manufacturing of molded polymeric components. MFR as defined herein refers to the quantity of a melted polymer resin that will flow through an orifice at a specified temperature and under a specified load. The MFR may be determined using a dead-weight piston plastometer that extrudes polypropylene through an orifice of specified dimensions at a temperature of 230° C. and a load of 2.16 kg in accordance with ASTM Standard Test Method D-1238.

Representative examples of suitable polypropylene impact copolymers include without limitation 4920W and 4920WZ, which are impact copolymer resins commercially available from Total Petrochemicals USA Inc. In an embodiment, the polypropylene impact copolymer (e.g., 4920W) has generally the physical properties set forth in Table 1.

TABLE 1

| Resin Properties | Typical Value | ASTM Method |
|---|---|---|
| Melt Flow, g/10 min. | 100 | D-1238 |
| Density, g/cc | 0.905 | D-1505 |
| Melting Point, ° C. | 160-165 | DSC |
| Mechanical Properties | | |
| Tensile strength at Yield, psi (MPa) | 3700 (25) | D-638 |
| Elongation at Yield, % | 6 | D-638 |
| Flexural Modulus, psi (MPa) | 190,000 (1,300) | D-790 |
| Notched Izod-ft.lb./in. (J/m) | 1.0 (50) | ASTM D-256A |
| Thermal Properties | | |
| Heat Deflection, ° C. | 90 | D-648 |

In an embodiment, a process employing a catalyst activator as described herein may provide an increased production efficiency when compared to an otherwise similar process not employing a catalyst activator. Without wishing to be limited by theory, improvements in production efficiency may be due to increased catalyst system activity over the duration of the user-desired process. Without wishing to be limited by theory, a process for the production of an impact copolymer employing a reactor system comprising more than one reactor type, such as those illustrated in FIGS. 1 and 2 may suffer process inefficiencies due to a decreased rate of production of the copolymer phase of the impact copolymer. For example, during production of a polypropylene impact copolymer, the formation of EPR occurs in the gas phase reactor. The residence time in the gas phase reactor may be longer than desirable due in part to a decrease in catalyst system activity. For example, a catalyst system having an activity $\alpha$ when used in the initiation of the polymerization process, may have an activity $\alpha\beta$ when it enters and is employed in one or more downstream gas phase reactors where $\beta$ is greater than 0 but less than 1. For example, $\beta$ is 0.9, 0.8, 0.7, 0.6, 0.5, 0.4, 0.3, 0.4, 0.3, 0.2, or 0.1. The catalyst activator may allow the catalyst system to maintain some higher threshold level of activity in a downstream gas phase reactor when compared to the activity of an otherwise similar process carried out in the absence of a catalyst activator. This higher threshold activity may result in an increased incorporation of a comonomer, decreased residence time in the copolymer producing reactor or both.

In an embodiment, a process (e.g., impact copolymer production process) employing a catalyst system (e.g., ZN, cocatalyst, external electron donor) when contacted with a catalyst activator through distributed additions as described herein may show an increase in the total polymer yield and/or an increase in the polymer yield rate of greater than 5%, alternatively greater than 10%, alternatively greater than 20%, alternatively greater than 30% when compared to an otherwise similar process carried out using an alternate methodology. As will be understood by one of ordinary skill in the art with the benefits of this disclosure, the absolute polymer yield rates and polymer yields will depend on a variety of factors (e.g., the nature of the polymer produced, the reaction conditions, type of catalyst) and will vary depending on such factors. Furthermore, a process (e.g., impact copolymer production process) employing a catalyst system when contacted with a catalyst activator through distributed additions as described herein may show an increased comonomer incorporation for a similar residence time in the gas phase reactor of 4 wt. %, alternatively 2 wt. %, alternatively 1 wt. % based on the total weight of the composition when compared to an otherwise similar process not employing the methodologies disclosed herein. In an embodiment, a process (e.g., impact copolymer production process) employing a catalyst system when contacted with a catalyst activator through distributed additions as described herein may show an increase in the gas phase reactor yield of from 5% to 30% when compared to an otherwise similar process not employing the methodologies disclosed herein. The process may be further characterized by an increase in the process efficiency of greater than 5%, alternatively greater than 7%, alternatively greater than 10% when compared to an otherwise similar process not employing the methodologies disclosed herein.

EXAMPLES

The following examples are given as particular embodiments of the disclosure and to demonstrate the practice and advantages thereof. It is understood that the examples are given by way of illustration and are not intended to limit the specification.

Example 1

Experiments were conducted to assess the effect on catalyst activity of the addition of extra TEAl (1 mmol) at various points in an impact copolymer (ICP) production process. The catalyst was ZN M1, a commercial heterogeneous Ziegler-Natta catalyst from Basell, containing about 2.4 wt % Ti and 18-19 wt % Mg. Referring to FIG. 1, in the ICP production process, the extra TEAl was added up front in the initial feed as indicated for example by reference arrow 501 and hereinafter referred to as point 1, after the baby loop (e.g., after the prepolymerization) as indicated for example by reference arrow 560 and hereinafter referred to as point 2, in the course of the bulk polymerization for times ranging from 30 to 50 min to simulate the end of the first loop as indicated for example by reference arrow 570 and hereinafter collectively referred to as point 3, at the end of the bulk polymerization stage to simulate the end of the second loop as indicated for example by reference arrow 580 and hereinafter referred to as point 4, and directly in the GPR as indicated for example by reference arrow 540 and hereinafter referred to as point 5. The addition of extra TEAl at points 2 and 3 was conducted at 70° C. under nitrogen pressure. When the extra TEAl additions occurred at point 4, a part of the liquid propylene was flared (the pressure was decreased from 485 to 200 PSI) and the remaining liquid $C_3$ was used to stir the fluff for a few minutes (3 min) with extra TEAl, added at room temperature under nitrogen pressure. Then, the remaining liquid $C_3$ was flared and the gas phase copolymerization portion of the process was conducted. General laboratory process conditions were as follows: bulk polymerization at 70° C. for 1 h, 1 mmol TEAl, CMDS as external donor (0.1 mmol giving an initial Al/Si ratio of 10). The GPR polymerizations were carried out under a constant flow of gases at 0.08 L/min hydrogen, 3.15 L/min ethylene and 3.85 L/min propylene. When extra TEAl was added at point 5, the liquid propylene was flared and extra TEAl was added in the GPR at room temperature. Then, the temperature and the pressure were respectively increased up to 75° C. and 135 PSI, and the gas phase copolymerization portion of the process was run for 25 minutes. Most of the polymerization experiments were run several times to ensure reproducibility and Table 2 gives average results for the process conditions where BD is the bulk density of the polymer fluff in g/ml, bulk yield refers to the yield of polypropylene homopolymer and ICP yield refers to the yield of EPR.

TABLE 2

| # | Number of trials | Comments | Total yield (g) | Estimated Bulk/Gas phase prod. balance (%) | Wt. % C2 (IR) | XS % | MF dg/10 min | BD g/ml |
|---|---|---|---|---|---|---|---|---|
| 1 | 12 | Standard Bulk Run Standard bulk run | 203 | — | — | 2.6 | 28 | 0.42 |
| 2 | 4 | Standard ICP | 237 | 19 | 8.4 | 13.3 | 16 | 0.45 |
| 3 | 1 | 1 mmol extra TEA1 at the beginning (=in the baby loop) | 312 | 24 | 10.7 | 15.7 | 18 | 0.45 |
| 4 | 3 | 1 mmol extra TEA1 at 70° C. in bulk (=after baby-loop) | 282 | 22 | 10.4 | 15.2 | 17 | 0.46 |
| 5 | 1 | 1 mmol extra TEA1 after X min in bulk (=after the first loop) X = 30 min | 280 | 17 | 7.7 | 16.6 | 15 | 0.44 |
| 6 | | X = 40 min | 270 | 19 | 8.6 | 17.0 | 14 | 0.44 |
| 7 | | X = 50 min | 282 | 21 | 9.4 | 15.3 | 15 | 0.46 |
| 8 | 3 | 1 mmol extra TEA1 at the end of Bulk (=after the second loop) | 250 | 23 | 10.3 | 15.9 | 17 | 0.46 |
| 9 | 4 | 1 mmol extra TEA1 in the GPR (=in the gas phase portion) | 257 | 23 | 10.2 | 16.9 | 21 | 0.47 |
| 10 | 1 | Two extra TEA1 additions 0.5 mmol in bulk after 30 min and 0.5 mmol in the GPR | 264 | 22 | 9.8 | 18.2 | 16 | 0.46 |

The polymerization results are compared to a standard ICP run shown in Row 2 of Table 2. As seen from the above results, addition of extra TEAl (1 mmol) increases the total polymer yield in the range 5-30%, the total ethylene content in the range 8.6-10.7% (as measured by FTIR) and the Bulk/Gas phase productivity balance in the range 19-24%. It can also be noticed that extra TEAl addition results in an increase in the xylene soluble (i.e., EPR) content (+1.9-3.7%), which is in agreement with a higher total $C_2$ content in the ICPs. In terms of melt flows and bulk densities, both are not greatly affected by an extra TEAl addition and are similar to those obtained with a standard ICP run.

Figure 3:
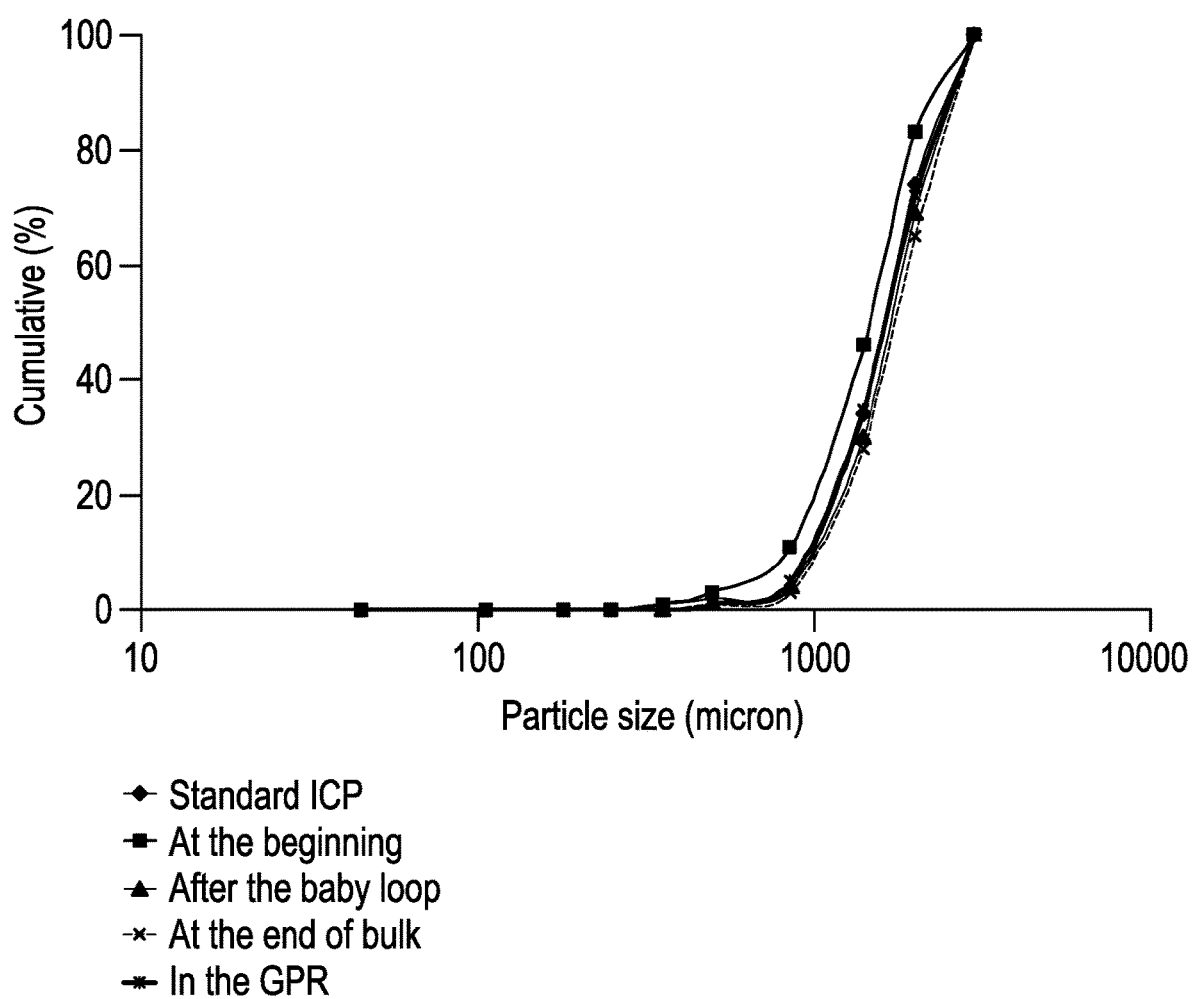
FIG. 3 is a plot of the particle size distribution of the polymer samples from Example 1.

The particle size distributions (PSD) of the ICPs were obtained via sieve analyses of the fluff samples as shown in FIG. 3. In terms of PSD, the distributions are similar to each other with no indication of polymer fines formation, although addition of more TEAl up front yields a slightly higher content of smaller particles. The average fluff particle sizes (D50) for the ICPs are in the range 1460-1740 microns vs. 1620 microns for a standard ICP.

Based on the laboratory results, it appears that addition of more TEAl up front gives the highest GPR reactivity enhancement with respect to the total polymer yield (+30%), to the Bulk/Gas phase productivity balance (24%) and to the total $C_2$ content (10.7%) Further, the addition of extra TEAl at other distributed points in the process also gives higher yields and $C_2$ contents than the control sample. In the case of extra TEAl addition in the course of the bulk, it was observed that the ethylene incorporation appears to be lower than expected despite the fact that the total polymer yields and the XS contents have increased. Moreover, the results also show that addition of more TEAl after the baby loop (e.g., FIG. 1, 560) and at the end of the bulk (FIG. 1, 580) yielded ICPs with 10.2-10.3% of ethylene. From the results, it can be concluded that the ethylene contents are likely underestimated when extra TEAl is added in the course of the bulk and may be closer to 10.2-10.3% (IR).

Figure 4:
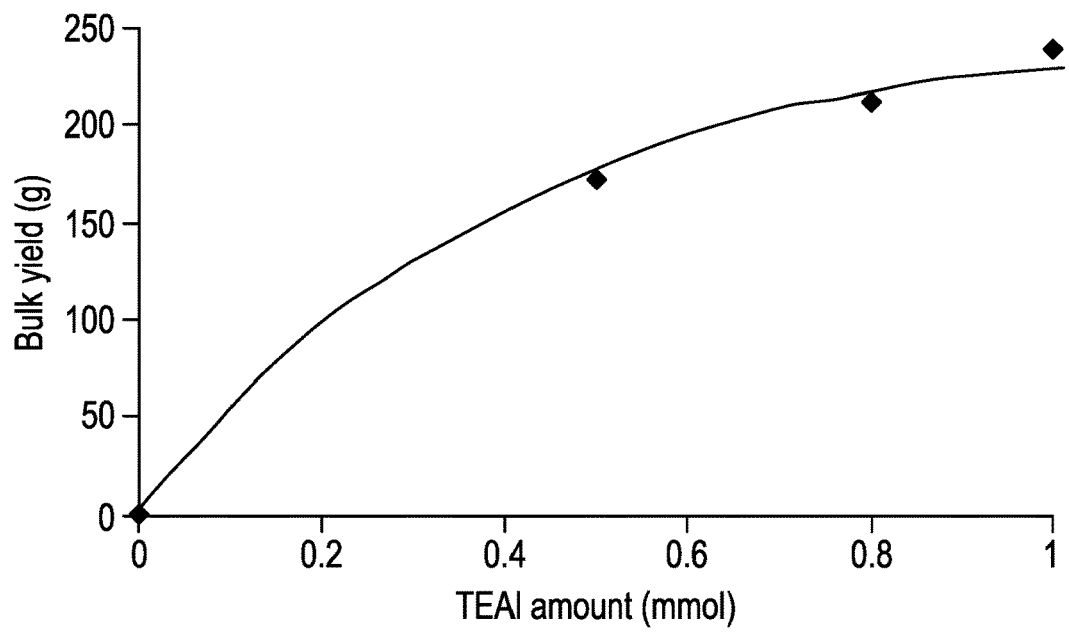
FIG. 4 is a plot of the bulk polymer yield as a function of the amount of TEAl added for the samples from Example 2.
Figure 5:
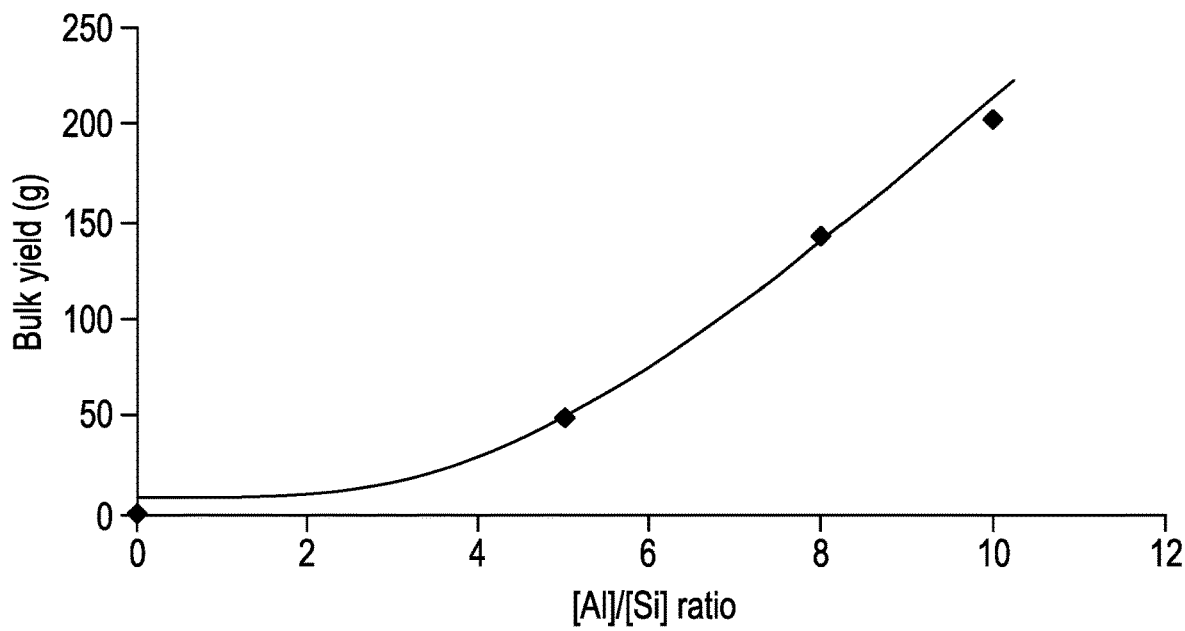
FIG. 5 is a plot of the bulk polymer yield as a function of the [Al]/[Si] ratio for the samples from Example 2.

An additional trial was carried out using a double extra TEAl addition by splitting 1 mmol of extra TEAl into 0.5 mmol extra TEAl in bulk and 0.5 mmol extra TEAl in the GPR to assess the effect of multiple additions vs. a single one on the GPR activity enhancement, as seen in Table 2, row 10. The results show that adding 0.5 mmol of extra TEAl two times in the process increases the Bulk/Gas phase productivity balance of the catalyst, but there is no more benefit compared to a single extra TEAl addition conducted with 1 mmol of TEAL polymerizations were conducted at 70° C. for 1 h by varying the initial TEAl or TEAl/CMDS amounts. The GPR was run at 135 psi and 75° C. for 25 min. The extra TEAl or TEAL/CMDS additions occurred either at the end of the bulk polymerization stage or in the GPR. For each experiment, the total TEAl amount is 2 mmol and the total CMDS amount is 0.1 mmol. Depending on the initial TEAL/CMDS amounts used to start the bulk phase, the addition of extra TEAl or extra TEAl/CMDS was done in order to reach a total TEAl concentration of 2 mmol and a total CMDS concentration of 0.1 mmol. The results of these runs are given in Table 3, FIG. 4 for Trial 1 and FIG. 5 for Trial 2.

TABLE 3

| Initial TEAl/CMDS ratio in bulk (mmol/mmol) | Extra TEAl/CMDS addition (mmol/mmol) | Total yield (g) | Estimated bulk/gas phase prod. balance (%) | Wt. % $C_2$ | XS % | XSAI (EPR fraction) % | MF dg/10 min | BD g/ml |
|---|---|---|---|---|---|---|---|---|
| 1.0/0.1 mmol Al/Si = 10 | Standard bulk run Standard ICP | 203 237 | NA* 19 | NA 8.4 IR | 2.6 13.3 | NA 13.4 | 28 16 | 0.42 0.45 |
| 0.5/0.05 mmol Al/Si = 10 Trial 1 | 1.5/0.05 at the end of bulk 1.5/0.05 in the GPR | 242 205 | 28 22 | 12.7 NMR 10.0 IR | 18.7 18.7 | 16.5 16.5 | 19 24 | 0.44 0.44 |
| 0.8/0.08 mmol Al/Si = 10 Trial 1 | 1.2/0.02 at the end of bulk 1.2/0.02 in the GPR | 280 300 | 24 21 | 10.8 NMR 9.6 IR | 17.2 16.0 | 17.9 ND | 15 19 | 0.45 0.46 |
| 0.5/0.1 mmol Al/Si = 5 Trial 2 | 1.5/0.0 in the GPR | 110 | 21 | 9.3 IR | 7.0 | ND | 16 | 0.42 |
| 0.8/0.1 mmol Al/Si = 8 Trial 2 | 1.2/0.0 at the end of bulk 1.2/0.0 in the GPR | 261 226 | 28 24 | 12.8 NMR 11.1 NMR | 17.0 17.6 | 17.8 ND | 15 15 | 0.44 0.43 |

ND = not determined

The results indicate that an extra TEAl addition increases the ZN M1 catalyst activity leading to higher polymer yields and higher total $C_2$ contents. Without wishing to be limited by theory, the benefit effect of extra TEAl addition may be due to the increase in the Al/Ti ratio, which is known to control the Ziegler-Natta catalyst productivity. Moreover, an addition of more TEAl in the polymerization medium may decrease the poisoning effect of moisture or other polar impurities that could be present in the monomers.

Example 2

An approach based on a two-step process modification was investigated to attempt to increase the Bulk/Gas phase productivity balance of an ICP production process employing a ZN catalyst, the Basell ZNM1 catalyst. Specifically, the effect of adding extra TEAl or TEAl/CMDS at the end of the bulk (FIG. 1, point 4) or in the GPR (FIG. 1, point 5) when lower initial TEAl or TEAl/CMDS amounts were used to run the bulk phase was assessed. Two approaches were investigated. In the first approach, Trial 1, both the initial TEAl and CMDS concentrations were decreased by keeping constant the Al/Si ratio of 10. In the second approach, Trial 2, only the initial TEAl concentration was decreased. The initial CMDS amount was kept constant to 0.1 mmol, involving a decrease of the Al/Si molar ratio for the experiments.

Specifically, the reaction conditions for bulk polymerization: liquid $C_3$=740 g; ZN M1 catalyst: 10 mg; $H_2$: 0.4 mol %; T=70° C.; 1 hour and in the GPR: $C_2$=3.15 L/min; $C_3$=3.85 L/min; $H_2$=0.08 L/min; 75° C.; 25 min. The bulk XSAI refer to the xylene solubles-acetone insoluble material in the polymer which is characteristically the EPR portion of the polypropylene impact copolymer. The xylene solubles content of the polymer may be determined as described previously herein. The resulting xylene soluble material may be further contacted with acetone and the material that is insoluble in acetone measured. Based on the laboratory results, the modifications conducted appear to increase the GPR reactivity giving Bulk/Gas phase productivity balances in the range 21-28%, total $C_2$ contents increased up to 12.8% as determined by NMR and higher total polymer yields. All the modified runs lead to higher fractions of XS and XSAI (EPR fraction) compared to a standard ICP, which is also in agreement with a higher GPR reactivity. Again, the bulk densities and the melt flow values for the polymer samples remained almost constant.

From the results, it can also be seen that the total polymer yield and the total $C_2$ content in the ICPs depend on the initial TEAl/CMDS concentration (which fixed the amount of extra TEAl/CMDS added). Referring to Table 3, by using a low initial TEAl/CMDS ratio (0.5/0.05) and by adding extra TEAl/CMDS (1.5/0.05 mmol), the total polymer yield was lower or similar to that obtained for a standard ICP run using only 1 mmol of TEAl and 0.1 mmol of CMDS. However, the ICPs contained a significantly higher total $C_2$ content up to 12.7% by NMR. By increasing the initial TEAl/CMDS mixture from 0.5/0.05 to 0.8/0.08, the total polymer yield increased in the range of 15-46%, depending on where the extra TEAl/CMDS addition was performed (at the end of the bulk polymerization stage or in the GPR), but the ethylene incorporation appeared to be lower (10.8 vs.

12.7% by NMR). However, the total C$_2$ content was still higher than that of a standard ICP. Based on the results, an initial TEAl/CMDS mixture of 0.8/0.08 followed by an extra TEAl/CMDS addition (1.2/0.02) gave a good productivity/C$_2$ incorporation balance and enhanced the GPR activity.

Referring to Table 3, it appeared that the effect of decreasing the initial TEAl amount at a constant CMDS amount (0.1 mmol) on the GPR reactivity strongly depended on the initial TEAl amount. By using a mixture of TEAl/CMDS (0.5/0.1) to run the bulk phase, the total polymer yield was divided by a factor of 2 and the C$_2$ content was only slightly higher than that of a standard ICP (9.3 vs. 8.4% IR). Without wishing to be limited by theory, a strong poisoning effect of the active sites by the external donor may account for the results. By increasing the initial TEAl/CMDS mixture from 0.5/0.1 to 0.8/0.1, the total polymer yield was 10% higher than that of a standard ICP, the Bulk/Gas phase productivity balance reached 28% and the total C$_2$ content was as high as 12.8% (NMR). Based on the results, an initial TEAl/CMDS mixture of 0.8/0.1 followed by an extra TEAl addition (1.2 mmol) gave a good productivity/C$_2$ incorporation balance and enhanced the GPR activity. From these results, it also appeared that the highest ethylene incorporation occurs when extra TEAl is added at the end of the bulk.

Referring to FIG. 1, the results further indicate that extra TEAl addition (1 mmol) at some defined points in the process (in the baby loop 510, after the baby loop 560, after the first loop 570, after the second loop 580, and in the GPR 540) increased the total polymer yield, the Bulk/Gas phase productivity balance and the total C$_2$ content in the ICPs without changing the ICP PSD, melt flows, or the bulk density. Addition of extra TEAl up front (in the baby loop 510) appeared to give the highest GPR activity enhancement. Other selected process modifications were performed by splitting a total TEAl amount of 2 mmol and a total CMDS amount of 0.1 mmol. The results show that the use of an initial TEAl/CMDS mixture (0.8/0.08) followed by an extra TEAl/CMDS (1.2/0.02) addition at the end of the bulk or the use of an initial TEAl/CMDS mixture (0.8/0.1) followed by an extra TEAl addition (1.2 mmol) at the end of the bulk increased the GPR reactivity leading to a good productivity/ethylene incorporation balance.

Example 3

Experiments were carried out in order to assess the effect on the GPR activity of the addition of extra TEAl (1 mmol) at 70° C. in the course of the bulk polymerization stage for times ranging from 0 min to 50 min. Extra TEAl (1 mmol) was added in the bulk phase at 70° C. under nitrogen pressure. The bulk polymerizations were conducted at 70° C. for 1 h, using 1 mmol TEAl, 0.1 mmol CMDS as the external donor, (initial Al/Si=10), Liquid C$_3$=740 g; ZN M1 catalyst: 10 mg; H$_2$: 0.4 mol %; while the GPR conditions were C$_2$=3.15 L/min; C$_3$=3.85 L/min; H$_2$=0.08 L/min; 75° C.; 25 min. The GPR was run at 135 psi and 75° C. for 25 min. There were four ICPs produced, ICP1, ICP2, ICP3 and ICP4 which were compared to their homopolymer polypropylenes PP1, PP2, PP3, and PP4. The polymer properties are presented in Table 4 where aR indicates the estimated bulk phase productivity balance.

TABLE 4

| # | Run | Time of TEA1 addition | Bulk yield (g) | Total yield (g) | GPR yield (g) | Prod. g/g | GPR activity g/g/h | aR | % C2 (IR) | MF dg/10 min | % XS | BD g/ml |
|---|---|---|---|---|---|---|---|---|---|---|---|---|
| 1 | PP | — | 194 | 194 | — | 19400 | — | — | — | 27 | 2.0 | 0.42 |
| 2 | ICP | — | 194 | 214 | 20 | 21400 | 4800 | 9 | 7.2 | 25 | 12.0 | 0.46 |
| 3 | PP1 | 0 | 236 | 236 | — | 23600 | — | — | — | 29 | 2.0 | 0.44 |
| 4 | ICP1 | 0 | 236 | 303 | 67 | 30300 | 16100 | 22 | 9.7 | 16 | 16.2 | 0.46 |
| 5 | PP2 | 30 | 218 | 218 | — | 21800 | — | — | — | 20 | 1.8 | 0.41 |
| 6 | ICP2 | 30 | 218 | 280 | 62 | 28000 | 14900 | 22 | 7.7 | 15 | 16.6 | 0.44 |
| 7 | PP3 | 40 | 208 | 208 | — | 20800 | — | — | — | 21 | 2.0 | 0.41 |
| 8 | ICP3 | 40 | 208 | 270 | 62 | 27000 | 14900 | 23 | 8.6 | 14 | 17.0 | 0.44 |
| 9 | PP4 | 50 | 192 | 192 | — | 19200 | — | — | — | 28 | 1.8 | 0.41 |
| 10 | ICP4 | 50 | 192 | 282 | 90 | 28200 | 21600 | 32 | 9.4 | 15 | 15.3 | 0.46 |

Figure 6:
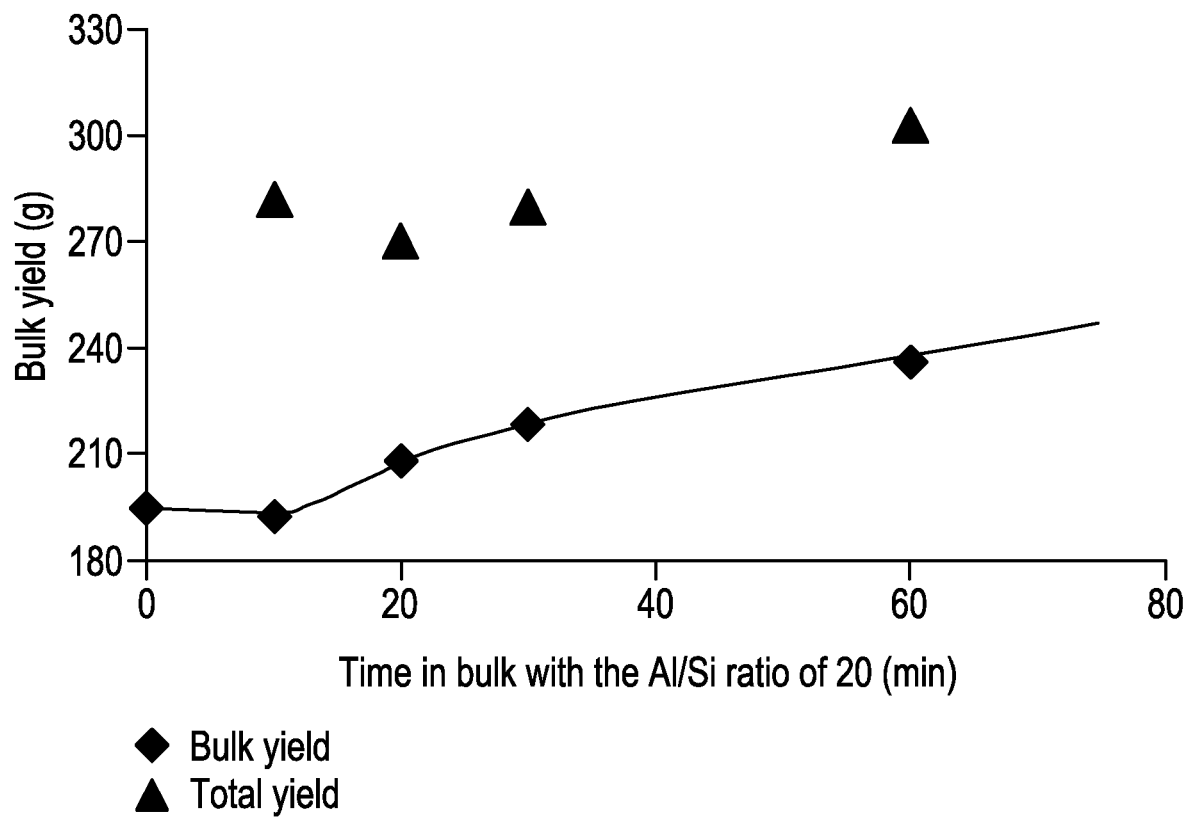
FIG. 6 is a plot of the bulk polymer yield as a function of the time in bulk for the samples from Example 3.

The results demonstrate, an extra TEAl addition in the bulk polymerization stage of the process increases the bulk yield, the total yield and the GPR yield compared to the standard PP and ICP runs. From the results, it appeared that the GPR yield was not greatly affected by time of TEAl addition. In contrast, the bulk yield depended on the time of TEAl addition, with the yield decreasing as extra TEAl was added later in the process. This result is not surprising since it is known that the catalyst productivity increases with the Al/Ti (and Al/Si) molar ratio. Furthermore, the results demonstrate that the addition of 1 mmol of extra TEAl in the bulk, resulting in an increase in the Al/Si ratio from 10 to 20, gave higher catalyst productivities in the bulk phase. For example the ICP prepared in the absence of extra TEAl resulted in an aR of 9 (see Row 2) whereas the addition of extra TEAl gave an aR ranging from 22 to 32 (see Rows 4,6,8) respectively. FIG. 6 shows the bulk yields vs. time when an Al/Si ratio of 20 was used in the bulk phase. As shown, the longer the time with the Al/Si ratio of 20 (i.e., after extra TEAl addition), the higher the bulk yields. Based on the bulk yields, the Basell ZN M1 catalyst productivity in bulk can be improved by 20% by increasing the Al/Si ratio from 10 to 20.

Additionally, the higher C$_2$ contents obtained by performing extra TEAl additions in the bulk (7.7-9.7 vs. 7.2%) confirm that the extra TEAl addition in the bulk had a beneficial effect on the GPR yield. Finally, it was observed that the polymer properties in terms of bulk density and melt flows were not greatly affected by performing extra TEAl additions. Moreover, the wt. % XS were higher with extra TEAl additions which are in agreement with a higher GPR reactivity. The results demonstrate that the addition of TEAl at different times in the bulk phase resulted in a greater ethylene incorporation.

Example 4

Effect of the concentration of extra TEAl added during the bulk polymerization stage on the bulk/gas phase productivity balance was investigated. Specifically, the amount of extra TEAl added in bulk was varied to assess its effect on the GPR activity enhancement. The extra TEAl addition was performed after 30 min in bulk, at 70° C. for TEAl amounts ranging from 0.5 mmol to 1.0 mmol. Specifically, the bulk polymerization conditions were: liquid $C_3$=740 g; ZN M1 catalyst: 10 mg; TEAL 1 mmol; CMDS: 0.1 mmol; $H_2$: 0.4 mol %; T=70 oC; 1 hour and the GPR conditions were: $C_2$=3.15 L/min; $C_3$=3.85 L/min; $H_2$=0.08 L/min; 75° C.; 25 min. Extra TEAl (1 mmol) was added in the bulk phase at 70° C. under nitrogen pressure. The polymer properties are given Table 5.

and the ethylene content in the ICPs via addition of extra TEAl in the ICP process. Although it is difficult to determine accurately how much the activity is increased in the GPR by performing extra TEAl additions in bulk, the higher $C_2$ contents in the ICPs confirm again that these process modifications increase the GPR reactivity.

Example 5

The effect of reducing the initial amount of cocatalyst on the bulk/gas phase productivity was investigated. Bulk polymerizations (each reaction was repeated four times)

TABLE 5

| Run | TEA1 amount | Bulk yield (g) | Total yield (g) | GPR yield (g) | Prod. g/g | GPR activity g/g/h | 1R | % C2 (IR) | MF dg/ 10 min | % XS | BD g/ml |
| --- | --- | --- | --- | --- | --- | --- | --- | --- | --- | --- | --- |
| PP | — | 194 | 194 | — | 19400 | — | — | — | 27 | 2.0 | 0.42 |
| ICP | — | 194 | 214 | 20 | 21400 | 4800 | 9 | 7.2 | 25 | 12.0 | 0.46 |
| PP1 | 0.5 | 210 | 210 | — | 21000 | — | — | — | 24 | 2.0 | 0.42 |
| ICP1 | 0.5 | 210 | 290 | 80 | 29000 | 19200 | 28 | 9.8 | 13 | 16.4 | 0.46 |
| PP2 | 0.8 | 212 | 212 | — | 21200 | — | — | — | 25 | 2.1 | 0.42 |
| ICP2 | 0.8 | 212 | 294 | 82 | 29400 | 19700 | 28 | 10.8 | 14 | 17.0 | 0.46 |
| PP3 | 1.0 | 218 | 218 | — | 21800 | — | — | — | 20 | 1.8 | 0.41 |
| ICP3 | 1.0 | 218 | 280 | 62 | 28000 | 14900 | 22 | 7.7 | 15 | 16.2 | 0.44 |

$$R = \frac{\text{GPR yield}}{\text{Total yield}}$$

The results demonstrate higher bulk yield, higher total yield, and higher GPR yields were obtained by performing an extra TEAl addition in the course of the bulk polymerization. The results also show that the amounts of polymer formed were similar regardless of the amount of extra TEAl added in the range of 0.5-1.0 mmol. Therefore, for this process, it was not necessary to work with an extra TEAl amount higher than 0.5 mmol to get the highest bulk/gas phase productivity balances. The results indicated that the melt flows of the polymers, the bulk density and the xylene soluble contents were not greatly affected by the amount of extra TEAl addition. In terms of ethylene incorporation, addition of more TEAl in bulk leads to ICPs with higher ethylene contents (up to 10.8%), which is in agreement with a GPR activity enhancement. Based on the results, it seems possible to increase the bulk/gas phase productivity balance were carried out as follows: liquid $C_3$=740 g; catalyst: ZN M1; CMDS: 0.1 mmol; $H_2$: 0.4 mol %; T=70° C.; 1 hour. GPR: C2=3.15 L/min; $C_3$=3.85 L/min; $H_2$=0.08 L/min; 75° C.; 25 min. Then, laboratory ICP experiments were conducted and an additional amount of TEAl was added after the 2nd loop (FIG. 1, 580) or directly in the GPR (FIG. 1, 590) as indicated to assess the effect on the GPR activity enhancement. For these experiments the total TEAl level in the process was in the range 1.0-1.2 mmol. The amounts of reactants and results are given in Table 6 and are compared to those obtained using standard conditions for ICP production.

TABLE 6

| | Reference | | Selected Process Modifications | | | | |
| --- | --- | --- | --- | --- | --- | --- | --- |
| RUN | PP Average | ICP Average | PP 4 runs | ICP Run 1 | ICP Run 2 | ICP Run 3 | ICP Run 4 |
| Catalyst (mg) | 10 | 10 | 12.5 | 12.5 | 12.5 | 12.5 | 12.5 |
| Initial TEA1 (mmol) | 1.0 | 1.0 | 0.6 | 0.6 | 0.6 | 0.6 | 0.6 |
| Initial CMDS (mmol) | 0.1 | 0.1 | 0.1 | 0.1 | 0.1 | 0.1 | 0.1 |
| Initial Al/Ti | 200 | 200 | 96 | 96 | 96 | 96 | 96 |
| Complement TEAL (mmol) | — | — | — | 0.6 mmol after 2nd loop | 0.6 mmol in the GPR | 0.4 mmol after 2nd loop | 0.4 mmol in the GPR |
| Total Al/Ti | 200 | 200 | 96 | 192 | 192 | 160 | 160 |
| Bulk Yield (g) | 203 | 203 | 203 | 203 | 203 | 203 | 203 |
| ICP Yield (g) | — | 237 | — | 252 | 284 | 245 | 282 |
| Estimated GPR balance | — | 19 | — | 23 | 26 | 21 | 24 |
| % C2 (IR) | — | 8.4 | — | 10.5 | 11.5 | 9.5 | 10.9 |
| XS % | 2.6 | 13.3 | 2.0 | — | — | — | 16.1 |
| MF g/10 min | 28 | 16 | 23 | 16 | 9 | 12 | 5 |
| Bulk Density g/ml | 0.42 | 0.45 | 0.42 | 0.46 | 0.46 | 0.46 | 0.46 |

A decrease in the initial amount of TEAl by 40% from 1.0 to 0.6 mmol with the standard catalyst load (10 mg of ZN M1) drops catalyst activity in bulk by ~35%. With the aim of maintaining the production rate in the loops (~200 gr bulk yield), more catalyst was added in the process; a catalyst load of 12.5 mg was found to be suitable to meet the process objectives.

From the above results, it can be seen that by dropping the initial amount of TEAl by 40% and increasing the initial amount of catalyst by 25%, a decrease in the catalyst activity in bulk of 20% (16.2 vs. 20.3 Kg/g/h) was observed without significantly affecting the polymer properties in terms of MF (28 vs. 23 g/10 min), bulk density (0.42 g/ml) and particle size distribution.

Figure 7:
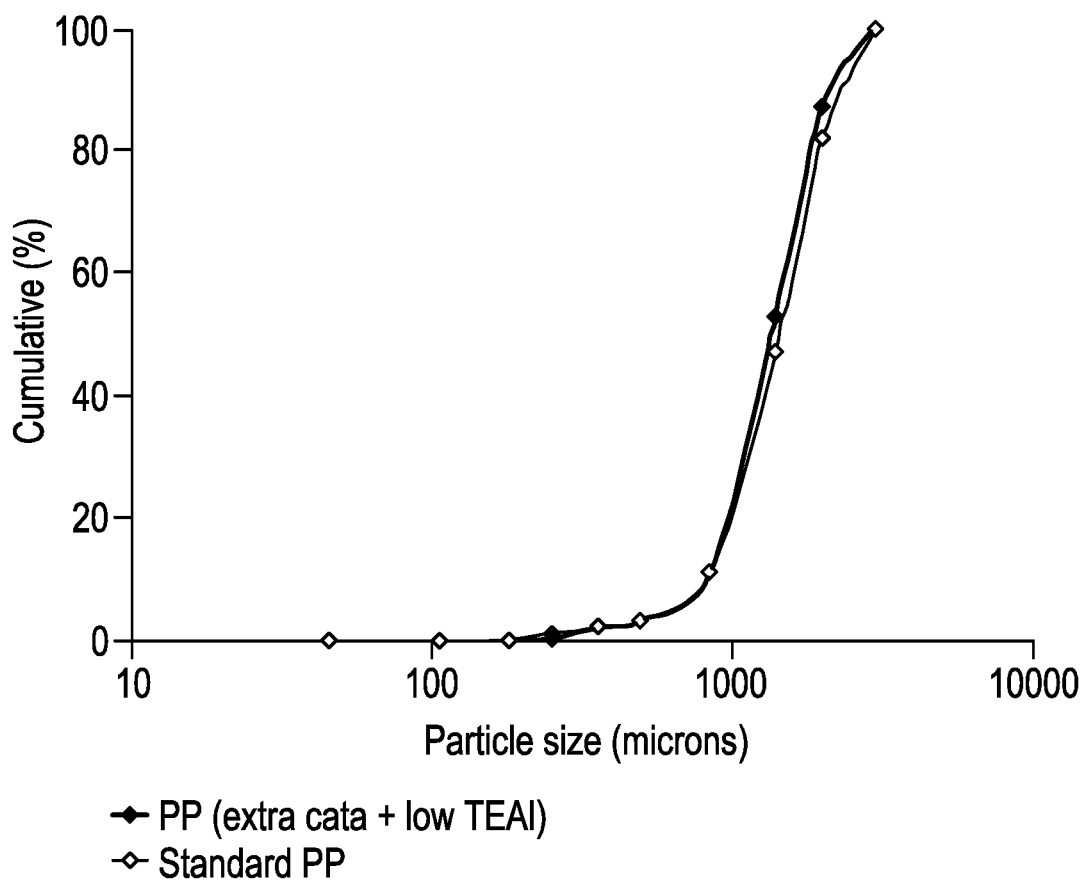
FIG. 7 is a plot of the particle size distribution for the polypropylene homopolymer samples from Example 5.

FIG. 7 shows the PP particle size distribution (PSD) obtained via sieve analyses of the fluff samples. As seen, even with more catalyst and with a lower bulk activity, the average fluff particle size (D50) is similar to that of a standard ICP, i.e., 1350 vs. 1450 microns. Also, by decreasing the initial amount of TEAl from 1.0 to 0.6 mmol and by keeping constant the external donor amount (i.e., CMDS) at 0.1 mmol, the Al/Si ratio decreases from 10 to 6, thereby allowing for better XS control (2.0 vs. 2.6%). Further, from the laboratory ICP results, it can be seen that these selected process modifications increase the total ICP yields, the total $C_2$ content in the ICPs (9.5-11.5 vs. 8.4%) and the bulk/gas phase productivity balances in the range 21-26% vs. 19%. The increase of the XS % from ~13 to ~16% is also consistent with a higher GPR reactivity. By increasing the complementary TEAl amount from 0.4 to 0.6 mmol, the total C2 content in the ICPs is ~1% higher regardless of where the TEAl is added in the process. The higher the amount of complementary TEAl, the higher the GPR activity enhancement. In addition, the larger increases in production efficiencies (e.g., total ICP yields) seem to be obtained by adding the TEAl directly in the GPR vs. after the 2nd loop.

Figure 8:
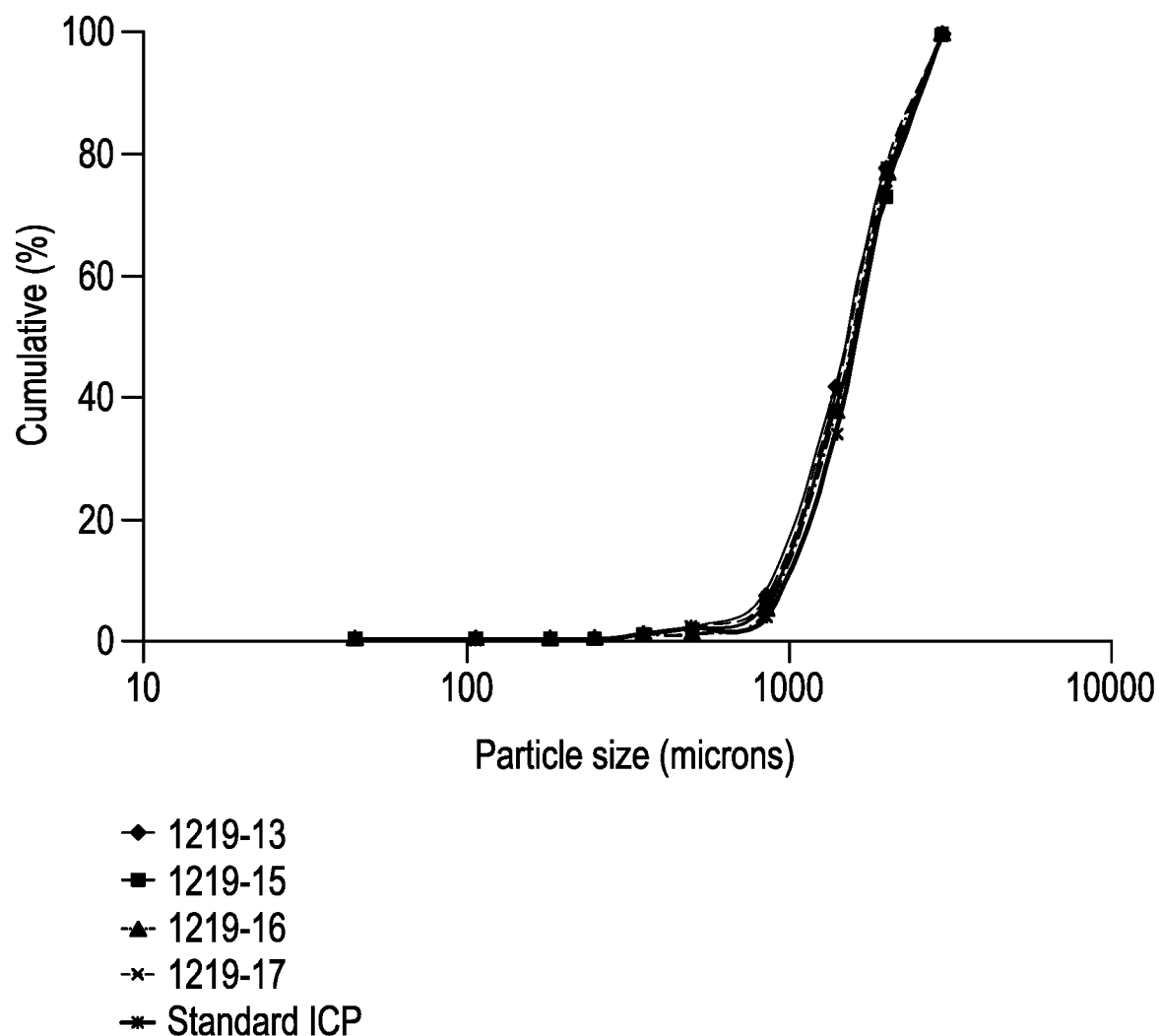
FIG. 8 is a plot of the particle size distribution for the impact copolymer samples from Example 5.

The particle size distributions of ICPs are presented in FIG. 8. The distributions are similar to that observed with the standard ICP production method, with no indication of polymer fines formation. The D50s are similar to that obtained for the standard ICP production method i.e., ~1550 vs. ~1620 microns. To conclude, these selected process modifications based on extra catalyst and on the splitting of the normal TEAl level between the baby loop and the GPR (or after the 2nd loop) increased the reactivity of the ZN M1 in the GPR reactor.

Example 6

The effect of varying the nature of the catalyst on the catalyst activator was investigated. Two catalysts were compared in this experiment. ZN M1, described previously in Example 1, and ZN 128M, a diether-based catalyst commercially available from Basell. The catalysts were used in the production of an ICP under a standardized set of conditions. The bulk reaction conditions were liquid propene: 740 g, external donor: CMDS, 70° C. in bulk. GPR conditions: C2: 3.15 L/Min, C3: 3.85 L/Min (R=0.45), H2: 0.08 L/Min for ZN M1, C2: 2.4 L/Min, C3: 3.6 L/Min (R=0.40), H2: 0.08 L/Min for ZN 128M. The results of these reactions are presented in Table 7.

TABLE 7

| | RUN | | | |
| --- | --- | --- | --- | --- |
| | PP Average | ICP Average | PP Run 9 | ICP Run 5 |
| | Catalyst | | | |
| | ZN M1 | ZN M1 | ZN 128M | ZN 128M |
| Catalyst (mg) | 10 | 10 | 3 | 3 |
| Initial TEAl (mmol) | 1.0 | 1.0 | 1.0 | 1.0 |
| Initial CMDS (mmol) | 0.1 | 0.1 | 0.015 | 0.015 |
| Initial Al/Ti | 200 | 200 | 456 | 456 |
| Hydrogen (mol %) | 0.40 | 0.40 | 0.68 | 0.68 |
| Bulk Yield (g) | 203 | — | 193 | — |
| Bulk Activity (kg/g/h) | 20.3 | — | 64.3 | — |
| ICP Yield (g) | — | 237 | — | 231 |
| Estimated GPR Balance (%) | — | 19 | — | 15 |
| % C2 (IR) | — | 8.4 | — | 5.8 |
| XS % | 2.6 | 13.3 | 3.2 | 6.8 |
| MF (g/10 min) | 28 | 16 | 178 | 127 |
| Bulk Density (g/ml) | 0.42 | 0.45 | 0.41 | 0.46 |

The results demonstrate that the ZN 128M exhibits a relatively low ability to incorporate ethylene for the production of high MF ICP resins i.e., ~6% total C2 at an ICP MF of 127 g/10 min. Further, under standard reaction conditions (i.e., 1 mmol TEAl), the ZNM1 catalyst produced an ICP containing 8.4 wt. % ethylene.

Example 7

ICP experiments were also conducted with the two catalysts by using extra catalyst/split TEAl to assess the effect on the GPR activity enhancement. In the case of ZN M1, the catalyst load was increased by ~25% when the TEAl level up front was decreased from 1 to 0.6 mmol, to maintain the solids level constant in the loops. Subsequently, the complement of TEAl to reach the normal TEAl level in the process (1 mmol) was added after the 2nd loop (FIG. 1, 580) or in the GPR (FIG. 1, 590) for activating the catalyst for the gas phase reaction. In the case of ZN 128M, the extra catalyst load was fixed at 15%, the initial TEAl amount at 0.6 mmol and the total TEAl level at 1.2 mmol. The bulk reaction conditions were: liquid propylene: 740 g, external donor: CMDS, 70° C. in bulk. GPR conditions: C2: 3.15 L/Min, C3: 3.85 L/Min (R=0.45), H2: 0.08 L/Min, 75° C. for ZN M1, C2: 2.4 L/Min, C3: 3.6 L/Min (R=0.4), H2: 0.08 L/Min, 75° C. for ZN 128M. Extra catalyst: 16% extra catalyst for ZN 128M. The results are presented in Table 8 and FIGS. 9 and 10.

TABLE 8

| RUN | PP Reference | ICP Run 6 | ICP Run 7 | PP Run 8 | ICP Run 9 | ICP Run 10 |
| --- | --- | --- | --- | --- | --- | --- |
| Catalyst | ZN M1 | ZN M1 | ZN M1 | ZN 128M | ZN 128M | ZN 128M |
| Catalyst Amount (mg) | 12.5 | 12.5 | 12.5 | 3.5 | 3.5 | 3.5 |

TABLE 8-continued

| RUN | PP Reference | ICP Run 6 | ICP Run 7 | PP Run 8 | ICP Run 9 | ICP Run 10 |
|---|---|---|---|---|---|---|
| Initial TEAl amount (mmol) | 0.6 | 0.6 | 0.6 | 0.6 | 0.6 | 0.6 |
| Initial CMDS (mmol) | 0.1 | 0.1 | 0.1 | 0.02 | 0.02 | 0.02 |
| Initial Al/Ti | 96 | 96 | 96 | 235 | 235 | 235 |
| Hydrogen mol % | 0.40 | 0.40 | 0.40 | 0.68 | 0.68 | 0.68 |
| Complement of TEAl | — | 0.4 mmol 2nd loop | 0.4 mmol GPR | — | 0.6 mmol 2nd loop | 0.6 mmol GPR |
| Total Al/Ti | 96 | 160 | 160 | 235 | 469 | 469 |
| Bulk Yield (g) | 203 | — | — | 198 | — | — |
| Bulk Activity (Kg/ · g · /h) | 16.2 | — | — | 56.6 | — | — |
| ICP Yield (g) | — | 248 | 282 | — | 240 | 170 |
| Estimated GPR balance (%) | — | 21 | 24 | — | 16 | 19 |
| % C2 (IR) | — | 9.5 | 10.9 | — | 6.5 | 7.7 |
| XS % | 2.0 | 14.1 | 16.1 | 3.8 | 14.3 | 13.8 |
| MF (g/10 min) | 23 | 12 | 5 | 268 | 181 | 216 |
| Bulk Density (g/ml) | 0.42 | 0.46 | 0.46 | 0.40 | 0.46 | 0.46 |

As seen from the results, using more catalyst in the baby loop (~15-25%), (FIG. 1, 510) with less TEAl (40-50%), decreases the bulk activity by approximately 20% for ZN M1, and approximately 12% for ZN 128M without greatly affecting the PP properties in terms of XS and BD. However, ZN 128M yields PP having significantly higher MF (268 vs. 178 g/10 min), suggesting that the use of a low TEAl level for the active sites formation modifies the hydrogen response of the ZN 128M diether-based catalyst.

Figure 9:
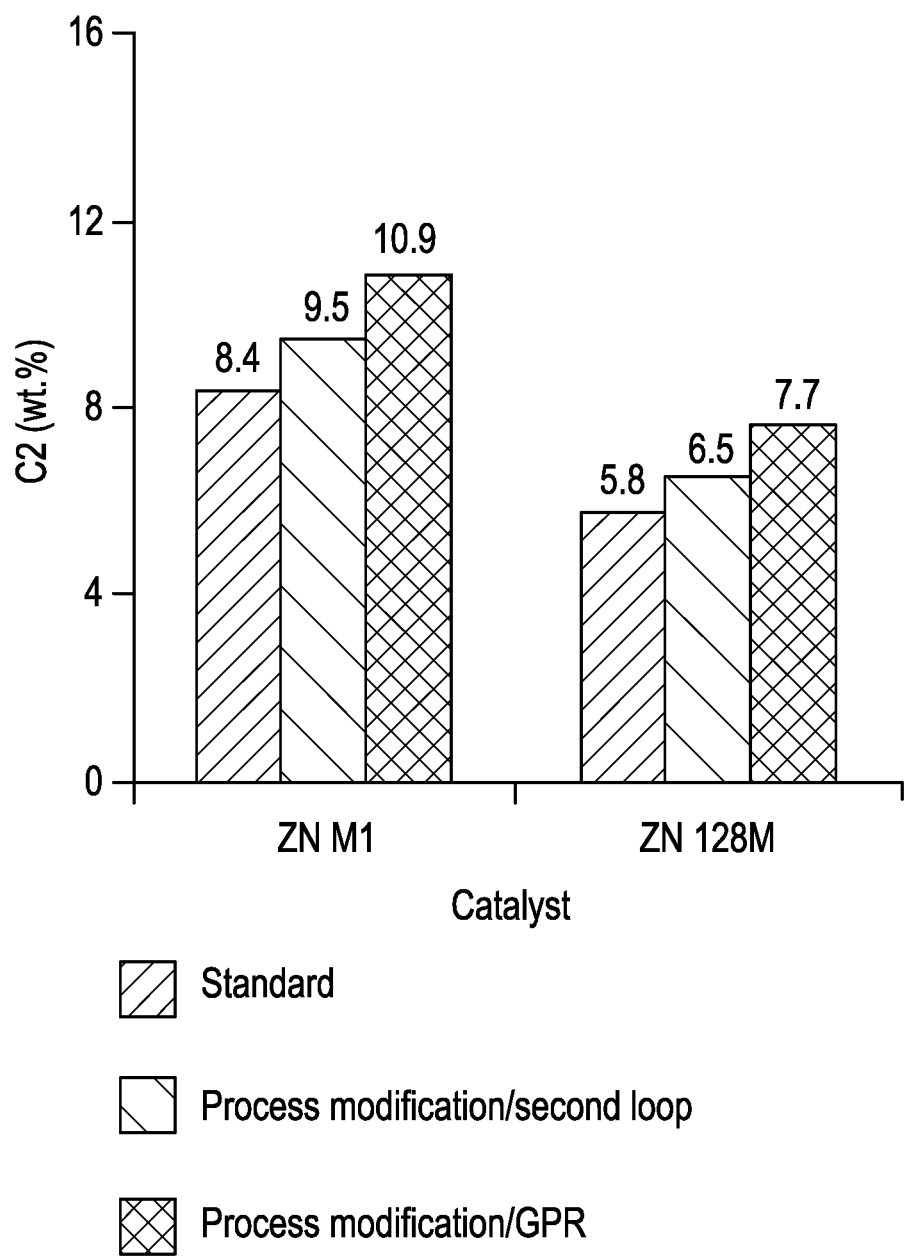
FIG. 9 is a graph of the ethylene content as a function of catalyst for the samples of Example 7.
Figure 10:
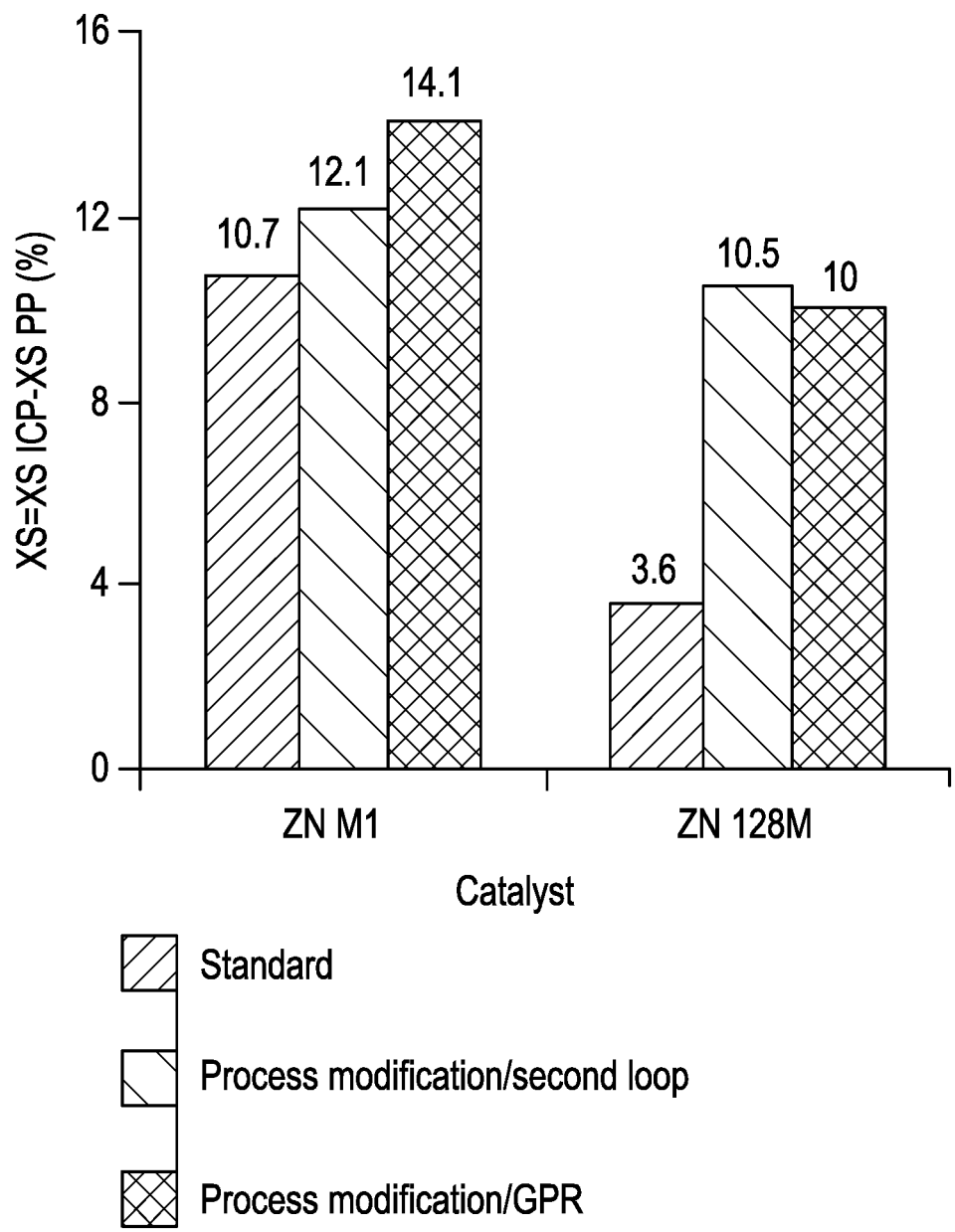
FIG. 10 is a graph of the percent xylene solubles as a function of catalyst for the samples from Example 7.

Referring to FIGS. 9 and 10, it can be seen that the process modifications based on extra catalyst/split TEAl clearly increased the GPR reactivity of the ZN M1 and ZN 128M catalysts giving higher Bulk/Gas phase productivity balances (+1-5%), higher total C2 contents (+2% in average) and higher XS levels (~X1.3 for ZN M1 and ~X2.8 for ZN 128M). Again with ZN 128M, the ICP MFs are shifted to higher values than those expected (~200 vs. 130 g/10 min) which without wishing to be limited by theory may be due to the low initial amount of TEAl. However, the result obtained with ZN 128M shows that by adjusting the hydrogen level the method can successfully be extended to diether-based catalysts that are typically gas phase limited for the production of high MF ICP resins. Moreover, the results demonstrate the highest GPR reactivity enhancement was obtained by adding the complement of TEAl directly into the gas phase reactor when compared to the reactivity obtained if the TEAl is added after the 2nd loop.

While various embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments disclosed herein. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
   preparing a multi-component catalyst system comprising a catalyst and a cocatalyst; and
   adjusting a level of a plurality of components of the multi-component catalyst system to maintain a user-desired level of catalyst activity throughout a polymerization process;
   wherein at least one component of the plurality of components comprises a catalyst activator, wherein the catalyst activator is the cocatalyst, wherein an amount of the cocatalyst introduced to a reaction zone is reduced as compared to an amount of the cocatalyst normally present in the polymerization process and an amount of catalyst introduced to the reaction zone is increased compared to an amount of the catalyst normally present in the polymerization process, wherein the amount of increase in the catalyst is between 10% and 25% and the amount of reduction in the cocatalyst is between 20% and 40%.

2. The method of claim 1, wherein the catalyst activator functions to maintain the catalyst system activity to a user-desired threshold level throughout the polymerization process.

3. The method of claim 1, wherein the multi-component catalyst system further comprises an electron donor.

4. The method of claim 1, wherein the multi-component catalyst comprises a metallocene catalyst.

5. The method of claim 1, wherein the cocatalyst comprises an organoaluminum compound.

6. The method of claim 5, wherein the organoaluminum compound comprises triethylaluminum, tri-isobutylaluminum, diethylaluminum chloride, diethylaluminum hydride, methylalumoxane, tri-isobutylaluminum, or combinations thereof.

7. The method of claim 1, wherein the multi-component catalyst system functions as a polymerization catalyst.

* * * * *